US008029665B2

(12) United States Patent
Steinhardt

(10) Patent No.: US 8,029,665 B2
(45) Date of Patent: *Oct. 4, 2011

(54) WASTEWATER SCREENING DEVICE

(76) Inventor: Jörg-Michael Steinhardt, Taunusstein (DE)

( * ) Notice: Subject to any disclaimer, the term of this patent is extended or adjusted under 35 U.S.C. 154(b) by 76 days.

This patent is subject to a terminal disclaimer.

(21) Appl. No.: 12/384,801

(22) Filed: Apr. 9, 2009

(65) Prior Publication Data

US 2010/0108582 A1 May 6, 2010

(30) Foreign Application Priority Data

May 5, 2008 (DE) .......................... 10 2008 022 167
Nov. 5, 2008 (EP) ..................................... 08019337

(51) Int. Cl.
*E03F 5/14* (2006.01)
(52) U.S. Cl. ......... 210/156; 210/159; 210/162; 210/413
(58) Field of Classification Search .................. 210/156, 210/159, 162, 170.03, 413, 415, 499
See application file for complete search history.

(56) References Cited

U.S. PATENT DOCUMENTS

| 591,767 | A | * | 10/1897 | Judson | 210/156 |
| 916,570 | A | * | 3/1909 | Maycock | 210/156 |
| 1,243,525 | A | * | 10/1917 | Howard | 210/156 |
| 1,875,790 | A | * | 9/1932 | Willis | 210/156 |
| 2,009,005 | A | * | 7/1935 | Schofield et al. | 210/159 |
| 2,086,821 | A | * | 7/1937 | Raisch | 210/159 |
| 2,198,943 | A | * | 4/1940 | Lowe | 210/162 |
| 3,856,216 | A | * | 12/1974 | Teague et al. | 241/46.01 |
| 4,642,195 | A | * | 2/1987 | Nill | 210/162 |
| 6,126,821 | A | | 10/2000 | Corcoran | |
| 6,953,524 | B2 | * | 10/2005 | Woodbridge et al. | 210/162 |
| 7,094,337 | B2 | * | 8/2006 | Williams et al. | 210/162 |
| 2009/0272685 | A1 | * | 11/2009 | Steinhardt | 210/499 |
| 2009/0314705 | A1 | * | 12/2009 | Steinhardt | 210/357 |
| 2010/0200483 | A1 | * | 8/2010 | Giehl | 210/170.03 |

FOREIGN PATENT DOCUMENTS

| DE | 2221605 | * | 11/1973 |
| DE | 4215002 A1 | | 12/1992 |
| DE | 19515924 A1 | | 10/1995 |
| DE | 19617665 | * | 11/1997 |
| EP | 488983 | * | 6/1992 |
| EP | 1223252 A2 | | 7/2002 |
| GB | 2310382 A | | 8/1997 |

(Continued)

OTHER PUBLICATIONS

Thompson/Jones/Basford, ThompsonRPM CSO Post Project Appraisal, Dec. 2004, Version 1.0, Wales, 413 pages.

*Primary Examiner* — Christopher Upton
(74) *Attorney, Agent, or Firm* — Price Heneveld LLP

(57) ABSTRACT

A screening device for wastewater includes a perforate screening member through which wastewater in an associated channel flows from a bottom side thereof to a top side thereof. An overfall wall is positioned in the wastewater channel. A clearing member is shiftable relative to the screening member for cleaning screenings therefrom, and is positioned upstream of the overfall wall. A waterwheel is positioned in the wastewater channel at a location downstream of the overfall wall, and is operably connected with the clearing member for mechanically shifting the same to remove the screenings from the screening member without using external power.

13 Claims, 4 Drawing Sheets

FOREIGN PATENT DOCUMENTS

| WO | WO 94/07585 A1 | 4/1994 |
| WO | WO 95/19471 A1 | 7/1995 |
| WO | WO 98/31882 A1 | 7/1998 |
| WO | WO 99/49145 A1 | 9/1999 |
| WO | WO 01/75240 A1 | 10/2001 |
| WO | WO 01/75249 A1 | 10/2001 |

* cited by examiner

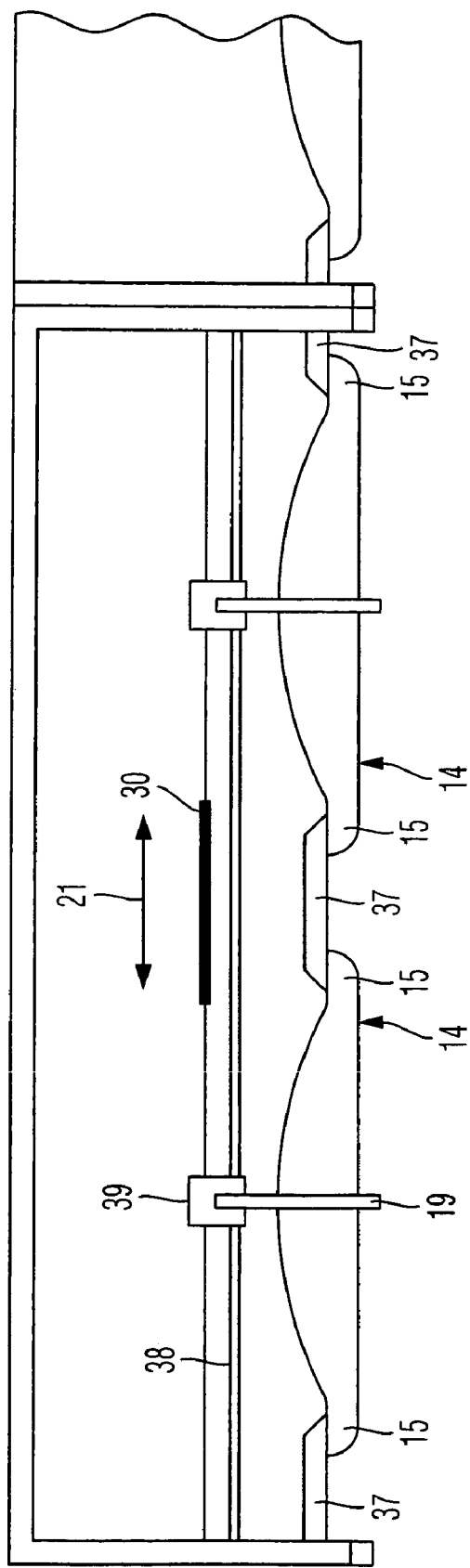

WASTEWATER SCREENING DEVICE

CLAIM TO PRIORITY

Applicant hereby claims the priority benefits under the provisions of 35 U.S.C. §119, basing said claim of priority on German Patent Application Serial No. 10 2008 022 167.8, filed May 5, 2008 and related European Patent Application Serial No. 08019337.8, filed Nov. 5, 2008. In accordance with the provisions of 35 U.S.C. §119 and Rule 55(b), a certified copy of the above-listed German patent application will be filed before grant of a patent.

BACKGROUND OF THE INVENTION

The present invention relates to a wastewater screening device for retaining solids at overflows which are carried along in the wastewater, having an apparatus for clearing away the screenings. The wastewater screening device includes a drive for the screen clearing apparatus which is upstream of an associated overfall, and is oriented such that the wastewater flows through the screening device from bottom to top.

Wastewater screening devices are generally know from DE 42 15 002 A1. In the latter, the screening device has a plurality of rods which are arranged in a parallel relationship, with a space or distance between the rods of several millimeters. An apparatus for clearing away the screenings lodged between the screening rods has wiper elements, which are moved by a drive that is arranged between the screening rods, and can be moved to and fro in order to remove the screenings from between the screening rods. The rods of the screening system are of a straight design, and arranged horizontally. The wiper elements are mounted in pivoting levers, which can pivot about an axle arranged above the rods. The rods are pivoted by a drive unit, which is mounted in an upper cross member of a frame of the screening device, and which is composed of a motor and a gear mechanism, with the drive unit being attached to a cover or to a wall of a structure which forms the rain overflow basin. It contemplates using an electric, pneumatic or hydraulic cylinder as the linear drive.

A disadvantage associated with this type of screening device is that the structure for holding the screening device, which includes the apparatus for clearing way the screenings and the drive, is extremely tall owing to the arrangement of the drive above the maximum wastewater level. Furthermore, the positioning of the screening device, and in particular of the drive, is tied to a predetermined location, because the drive requires a power source for the motor, such as an electric motor, a pneumatic motor, or a hydraulic cylinder. It is therefore not possible to mount the screening device at any desired location. On the other hand, this outside or extraneous energy drive is located in a region of the installation, such as a high water spillway installation, in which it is subjected to moisture, which results in an increased risk of faults or of failure of the drive for the screen clearing apparatus.

EP 1 223 252 A2 describes a screen device which is mounted in a dividing wall between a wastewater main channel and an associated side channel. This screening device has a fixed drum which is enclosed at the sides, and divides the main channel from the side channel. The drum is provided with a large opening on its side facing the main channel, with the result being that the wastewater can pass into the drum from the main channel via the opening. On the side facing the side channel, the drum is provided in its lower region with a screen, so that material which is carried along in the wastewater is retained at the drum when the flow passes through the drum, and only clean water can pass from the drum into the side channel. An apparatus for clearing away the material is rotatably mounted within the drum. The device is driven by a waterwheel, which is arranged downstream of the screen in the direction of flow. The rotating waterwheel rotates the apparatus for clearing away the screenings via a belt or a drive.

Screening devices which are configured in a similar manner to that disclosed in DE 42 15 002 A1 are also described, for example, in DE 195 15 924 A1, WO 98/31882, WO 99/49145 and WO 01/75249 A1.

SUMMARY OF THE INVENTION

One aspect of the present invention is a wastewater screening device having a robust drive, with a particularly uncomplicated apparatus for clearing away the screenings, wherein the screening device is of compact design and can be used independently in a wide variety of different locations.

The apparatus for clearing away the screenings can be driven by a waterwheel without using outside or extraneous energy, and the waterwheel is arranged downstream of the overfall wall in the direction of flow of the wastewater.

Since the screen clearing apparatus is arranged upstream of the overfall wall, and the waterwheel which drives the screen clearing mechanism is positioned downstream of the overfall wall, overall profile of the present invention can be compact, and have a relatively low overall height. All that is necessary is for the wastewater to be able to pass over the overfall wall. The wastewater flows from the bottom to the top through the screening device, and given a corresponding liquid level, over the overfall wall, and drops downward from there onto the waterwheel, and therefore rotates the waterwheel to drive the apparatus for clearing away the screenings.

The waterwheel drive makes it possible to power the apparatus for clearing away the screenings without using any outside power or energy. It is not necessary to provide an external power connection for driving the device for clearing away the screenings. This not only makes it possible to configure the screening device in a compact way, but also provides the particular advantage of allowing the screening device to be used independently in a wide variety of different locations.

The uncomplicated configuration of the screening device, with the simple waterwheel drive, and the interaction of the waterwheel and the screen clearing apparatus, allows the screening device to be made particularly simply. Overall, a robust drive is obtained for the screen clearing apparatus.

The transmission of the movement of the waterwheel to the screen clearing apparatus can be effected in different ways, for example by direct mechanical means, or by the waterwheel driving a power medium for moving the apparatus for clearing away the screenings. Preferably, the waterwheel can be used to drive a pump by means of which a piston and/or motor of the screen clearing apparatus can be driven. The pump can be driven in particular by a belt drive which is driven by the waterwheel.

The screen clearing apparatus is preferably embodied as a wiping element for screenings. The screening device is particularly configured in such a way that it has a plurality of screening rods, and the screen clearing apparatus has movable screening elements which are arranged between the screening rods. A linkage, by which the screening elements can be moved forward and backward and/or in a circular fashion by a lever, can expediently be driven by the waterwheel. The object is that the wiping elements automatically remove the materials which have been carried along by wastewater, and become lodged between the screening rods, and convey the same to the side, so that the free passage cross section for the wastewater is retained between the screening rods.

The screen clearing apparatus can preferably be driven in opposite directions, or bi-directionally. The screenings are therefore cleared away by the to and fro movement of the apparatus, in particular by the to and fro movement of the wiping elements which are arranged between the screening rods.

In terms of reducing the overall height of the screening device, it is considered particularly advantageous that the drive for the screen clearing apparatus, in particular the wiping elements for the screenings, includes a waterwheel linkage mechanism, wherein the linkage passes through the overfall wall, and this passage through the overfall wall is embodied in a watertight fashion. It is considered particularly advantageous if this passage is notched, and made watertight by a front box.

The screening rods, which are used in the screening device, can be configured in different ways. According to one basic configuration, the screening rods are curved, in particular, curved concavely on the clean water side. The materials which are carried along with the wastewater are therefore retained in a concavely shaped region of the rods which faces the wastewater side of the screening device. In particular, the rods are arranged in such a way that they extend over an angle of 90 to 180 degrees, and in particular over an angle of 90 degrees or 120 degrees. As a result of this arrangement, the screening device itself is relatively flat, even with curved screening rods, and requires only a relatively small overall height. Alternatively, the screening rods may be of an essentially straight design. In this case, the screening device is preferably of a flat construction.

The invention contemplates a screening device, which serves for protecting overflow weirs in a mixed system and/or a separating system, in order to protect bodies of water against the introduction of hygiene articles, toilet paper, and the like. The screening device is driven by a waterwheel without using outside power or extraneous energy. The waterwheel can also drive a pump, which drives a hydraulic piston and/or motor portion of the wiping mechanism which clears the debris or screenings. Fine screenings are cleared away, with the distance between the rods being generally 4 to 6 mm. Larger distances between the rods are also possible. The screenings can be wiped away in a gentle fashion over a relatively short distance by virtue of the inventive configuration of the screening device. It is possible to arrange clam zones, which are embodied as flat, broad cross struts, and in this context, they take up or reduce the water pressure and/or discharge flow into the grill frame structure, which is preferably of a modular design. Depending on the required capacity, the screening rods are arranged curved, with the result that the screenings are lowered into relatively deep layers, and can correspondingly be transported away easily and with less flow pressure to the wastewater treatment plant from the water which is running over. The screening rods are in particular shaped in such a way that they can be placed one against the other, like two nested half-moons which engage in the screening rod.

Further features of the invention are illustrated in the patent claims, the description of the figures and the figures themselves, and in this context, it should be noted that all the individual features and all the combinations of individual features constitute further inventive embodiments.

The invention is illustrated by way of example in the figures by means of a plurality of embodiments, without being restricted thereto.

BRIEF DESCRIPTION OF THE DRAWINGS

In the drawings:

FIG. 4 shows the flat screening system which is shown in FIG. 3, illustrated in a section in the longitudinal direction of the channel.

DETAILED DESCRIPTION OF THE PREFERRED EMBODIMENTS

Figure 1:
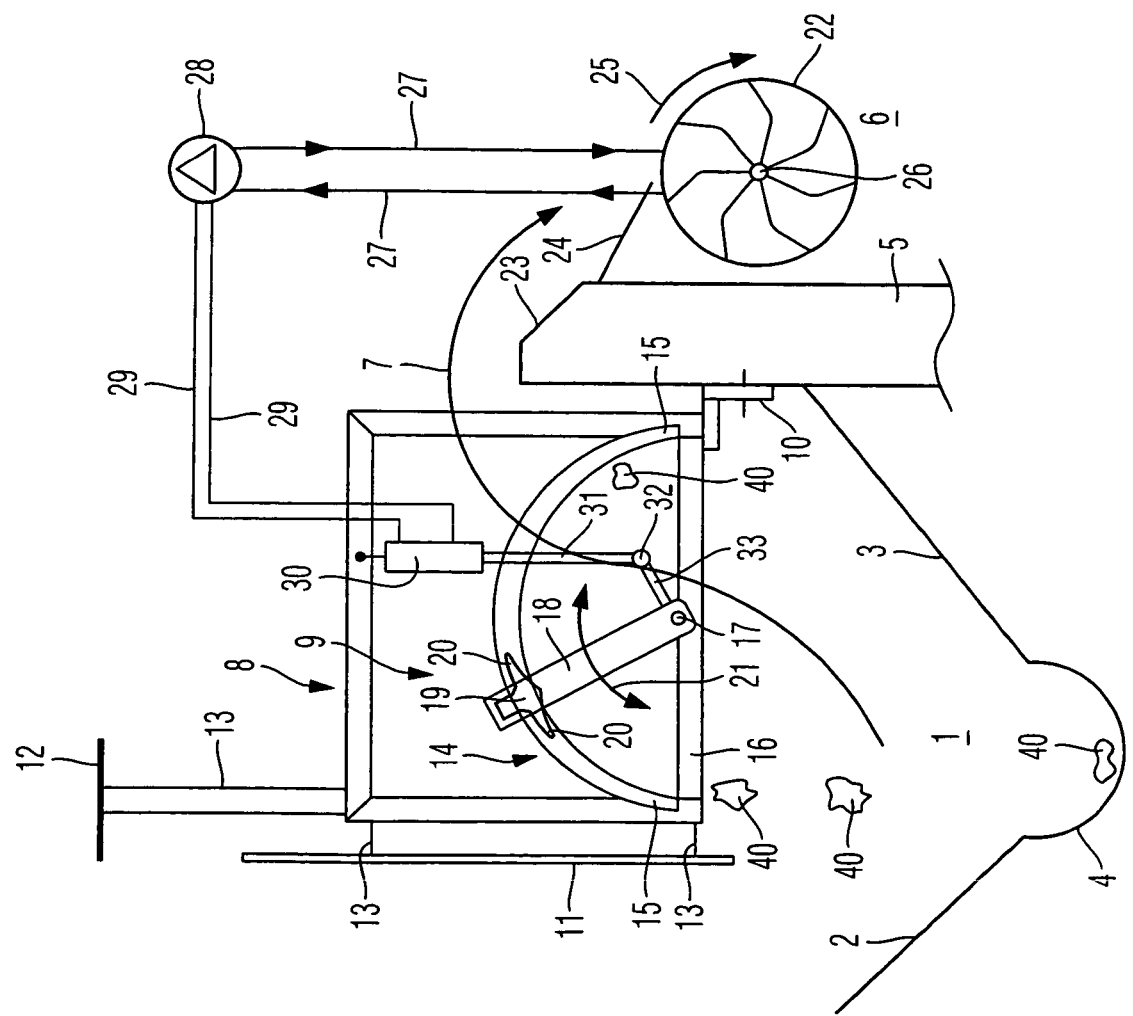
FIG. 1 shows a cross section through the longitudinal extent of a channel and an overfall wall which bounds the channel laterally with the screening device, which is embodied as a curved screening system, and with a waterwheel drive for the curved screening system.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 illustrates a wastewater channel 1 with inclined floor sections 2 and 3 which extend toward one another, and a dry weather gully 4 which connects the two floor sections 2 and 3 in the region of the lower ends. The wastewater channel 1 is bounded laterally in the region of the floor section 3 by a vertically arranged overfall wall 5 which extends significantly beyond the level of the floor section 3. If an increased volume of wastewater flow occurs when the drainage system is being operated in the mixed system or separating system, some of the wastewater can flow over the overfall wall 5 and pass from there into an overflow channel 6, which is located next to the overfall wall 5, and then pass from the overflow channel into a body of water or receiving water course. The line 7 (FIG. 1), which is indicated with an arrow, shows the direction and way in which the flow passes from the wastewater channel 1 into the overflow channel 6 when there is an increased occurrence of wastewater, particularly during a heavy rain event. In particular, in the case of heavy rain, considerable quantities of contaminants, such as hygiene articles, paper and plastics, can flow into the receiving water course or the body of water if no screening device is provided.

A frame 8 extends essentially over the length of the wastewater channel 1, serves to hold a screening device 9, and is arranged above the wastewater channel 1. The frame 8 is connected, on the one hand, via an attachment angle 10 to the overfall wall 5 on the side facing the wastewater channel 1, and on the other hand, to a channel wall 11 and/or to a channel cover 12 by struts 13. The screening device 9, which is connected to the frame 8, is in FIGS. 1 and 2 embodied as an arcuate or round screening element with a plurality of identical screening rods 14, which are arranged one behind the other with respect to the plane of the diagram in FIG. 1. Screening rods 14 are configured in an essentially semicircular curve, with adjacent screening rods being 4 to 6 mm apart, and with the two free ends 15 of each of the screening rods 14 being directed downwardly. The ends 15 of screening rods 14 are connected to frame 8 in the region of a lower horizontally arranged strut 16. Each screening rod 14 is therefore curved inwardly on the wastewater side facing the channel, and is curved outwardly on the side facing away from the channel, that is to say, the clean water side. The screening rods 14 extend over an angle of 180 degrees, but smaller angles are also conceivable, for example angles of 90 to 120 degrees, and in particular an angle of 90 degrees or an angle of 120 degrees.

The illustrated screening rods 14 (FIGS. 1 and 2) have a smaller degree of curvature on the wastewater side than on the clean water side.

In the region of half the length of the frame strut 16, a plate-shaped lever 18 is mounted, so as to be freely pivotable about an axis 17, with the large surface side of the lever 18 being arranged parallel to the large surface side of the respective plate-shaped screening rod 14 and perpendicular to the longitudinal extent of the axis 17. The lever 18 is guided in the frame 8 along a semicircular path, and accommodates the wiping element 19, which is arranged between two adjacent struts 13. The wiping element 19 has two radial ends 20 which terminate in a cone shape. The ends 20 are located between the adjacent screening rods 14.

If a very large flow volume of wastewater occurs, resulting in wastewater passing over the overfall wall 5, contaminants which are carried along in the wastewater, and which are referred to herein by the reference numeral 40, such as hygiene articles, paper and plastics, etc., are held back or captured by the screening rods 14 as the wastewater passes through the screening device. In the example illustrated in FIGS. 1 and 2, the screenings are cleared away by the levers 18, which can pivot to and fro in the directions of the double arrow 21, with the wiping elements 19 being connected to the levers. The levers 18 are pivoted to such an extent that the wiping elements 19 moves the debris or screenings to the opposite ends 15 of the screening rods 14.

In the illustrated example, the levers 18 are driven together with the wiping elements 19 by means of a waterwheel 22. There is therefore a drive which does not require outside power or extraneous energy, since the waterwheel 22 is arranged after or downstream of the overfall wall 5 in the direction of flow of the wastewater. As is apparent from the arrow in line 7 (FIG. 1), the wastewater passes behind the overfall wall 5, which is provided with a slope 23, onto a discharge plate 24, which is arranged obliquely and connected in the lower region of the slope 23 to the overfall wall 5. The wastewater then passes from the discharge plate 24 to the waterwheel 22, which rotates in a clockwise direction, as shown by the arrow 25. The waterwheel 22 first drives a belt 27 via a waterwheel shaft 26, which in turn drives pump 28, such as a hydraulic pump, via belt 27. Pump 28 is connected by pressure lines 29 to a piston 30, which is mounted on the frame 8, and whose piston rod 31 is connected by a joint 32, which is arranged at a distance from the axis 17, and has an attachment 33 connected to all of the screening rods 14. A controller (not shown) for the hydraulics causes the pivoting movement of the lever 18 to be reversed in the direction of the other end 15 of the screening rods 14 when the wiping elements reach the end position adjacent to one end 15 of the screening rods 14, so as to ensure a continuous cleaning effect of the screening system.

In the embodiment illustrated in FIG. 1, the mechanism which transmits the movement of the waterwheel 22 to the levers 18 and to the wiping elements 19 is arranged outside the overfall wall 5, and is located above the maximum liquid level.

Figure 2:
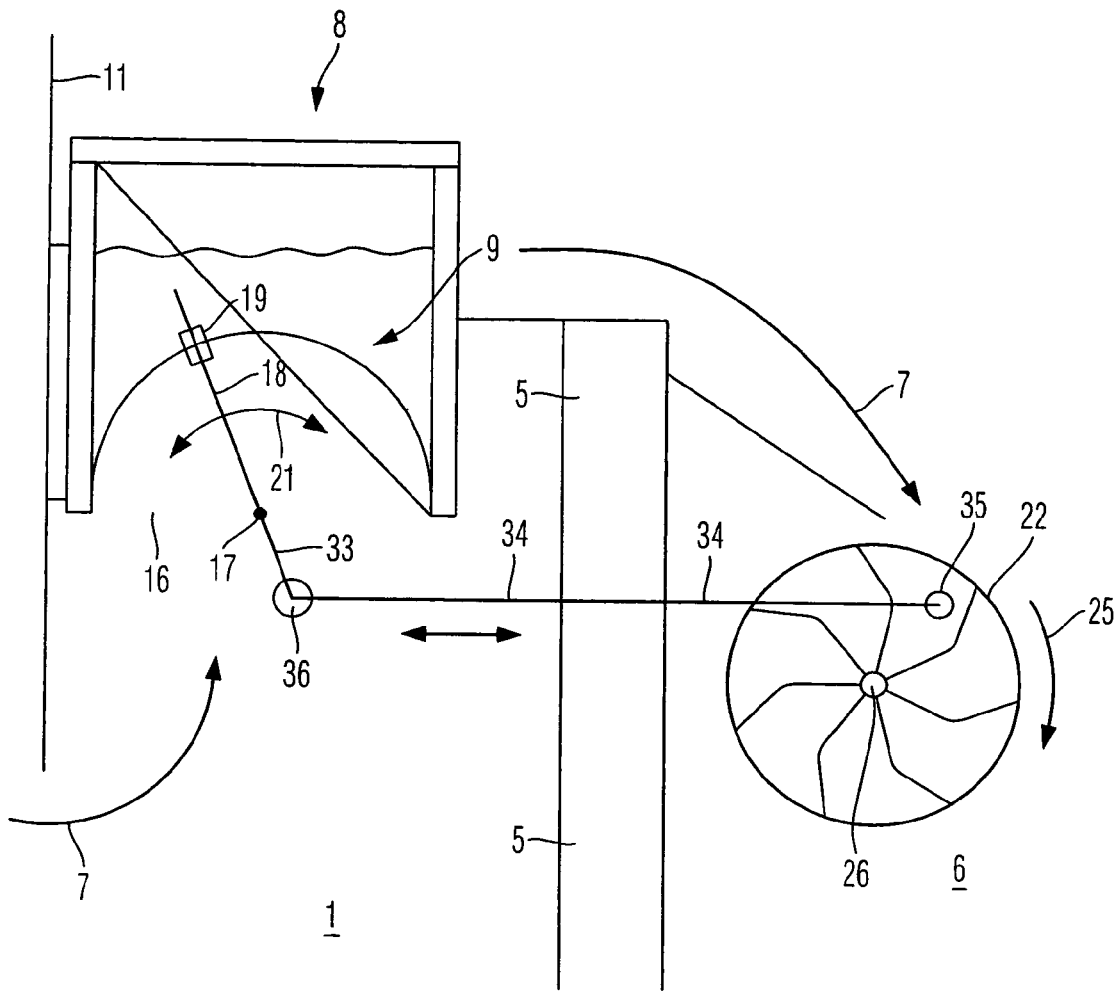
FIG. 2 shows a modified water drive for the curved screening system, also illustrated in a cross section of the longitudinal extent of the channel.

In contrast, in the embodiment according to FIG. 2, the mechanism which transmits the movement of the waterwheel 22 to the levers 18 and the wiping elements 19 passes through an opening or bore in the overfall wall 5. A waterwheel linkage mechanism 34 is provided for this. The linkage 34 passes through the overfall wall 5 and is operably connected with the waterwheel 22 by a pivoting bearing 35 and to the attachment 33 by a pivoting bearing 36. The screening device is also embodied as a curved screening system in the embodiment illustrated in FIG. 2. Reference is made in this respect to the statements relating to the variant described in FIG. 1.

Figure 3:
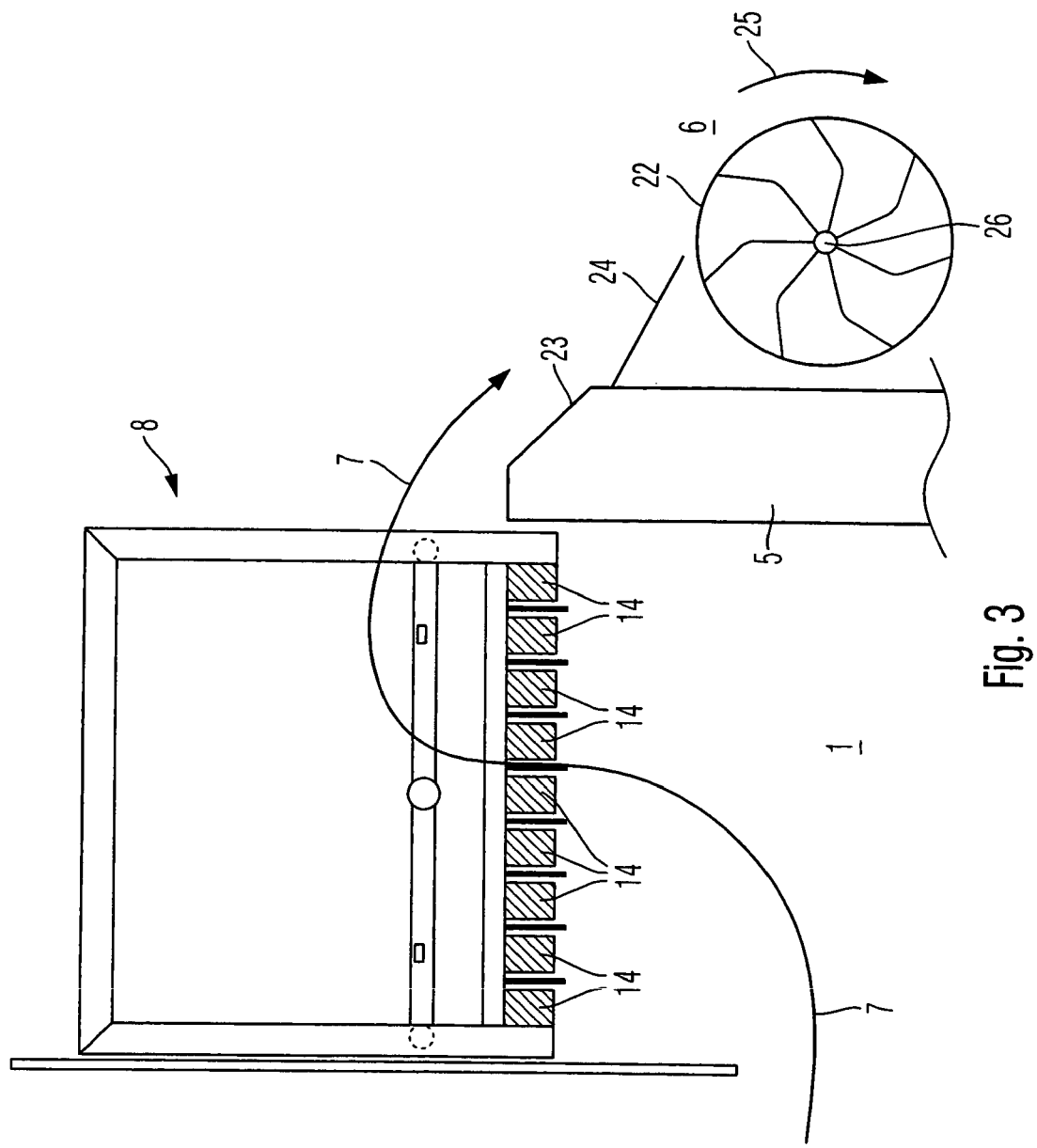
FIG. 3 is a cross-sectional illustration through the longitudinal extent of the channel showing the arrangement of a flat screening system which is driven by means of a water drive.

In contrast, in the embodiment according to FIGS. 3 and 4, the screening system is a flat screening system. In this system, a plurality of screening rods 14, which are arranged mutually parallel and oriented horizontally, are mounted in the region of the lower end of the frame 8. In the illustrated example, the screening rods 14, which are formed from sheet metal, are not only arranged parallel to one another, but are also arranged one behind the other in a common plane, with only two screening rods 14 being shown completely in FIG. 4. The screening rods 14 taper starting from their centers to their opposite ends 15, as oriented in FIG. 4. In the region of the two ends 15, the screening rods 14 are connected on their clean water sides to flat metal elements 37, which are mounted on the frame 8. In addition, guide rails 38, which are arranged horizontally on the clean water side of the screening rods 14, are mounted on the frame 8, and support bearing elements 39 for holding the various wiping elements 19 that are arranged between adjacent screening rods 14. The respective mount can be moved to and fro between the ends 15 of adjacent screening rods 14, and the mount penetrates the clear cross-sectional spaces between the screening rods 14. By means of the cylinder 30, with which the waterwheel 22 acts in a kinematic sense as shown in FIG. 1, the bearing elements 39 can be moved to and fro with the wiping elements 19, in which case all the wiping elements 19 are moved synchronously either in one direction or in the opposing direction, as shown by the double arrow in FIG. 4.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A screening device for wastewater, and the like, comprising:
    a perforate screening member through which wastewater in an associated wastewater channel flows from a bottom side thereof to a top side thereof, such that solids in the wastewater are captured by said screening member and form screenings on said screening member;
    an overfall wall positioned in said wastewater channel;
    a clearing member being shiftable relative to said screening member for clearing the screenings therefrom, and being positioned upstream of said overfall wall;
    a waterwheel positioned in said wastewater channel at a location downstream of said overfall wall, and being operably connected with said clearing member for mechanically shifting the same to remove the screenings from said screening member without using external power; and a pump operably connected with said screen clearing member for shifting the same to remove the screenings from the screening member, and operably connected with and driven by said waterwheel.

2. A screening device as set forth in claim 1, including:
a drive belt operably interconnecting said pump with said waterwheel.

3. A screening device as set forth in claim 1, wherein:
said clearing member includes at least one wiping element.

4. A screening device as set forth in claim 1, wherein:
said screening member includes a plurality of screening rods; and
said clearing member includes a plurality of wiping elements which are disposed between said screening rods.

5. A screening device as set forth in claim 4, wherein:
said clearing member can be shifted forward and backward and/or in a circular fashion.

6. A screening device as set forth in claim 4, wherein:
said screening rods have curved side elevational configurations which extend convexly toward a clean water side thereof.

7. A screening device as set forth in claim 6, wherein:
said screening rods are arranged at an angle in the range of 90-120 degrees.

8. A screening device as set forth in claim 4, wherein:
said screening rods have a generally straight configuration.

9. A screening device as set forth in claim 8, wherein:
said screening member has a generally flat configuration.

10. A screening device for wastewater, and the like, comprising:
a perforate screening member through which wastewater in an associated wastewater channel flows from a bottom side thereof to a top side thereof, such that solids in the wastewater are captured by said screening member and form screenings on said screening member;
an overfall wall positioned in said wastewater channel;
a clearing member being shiftable relative to said screening member for clearing the screenings therefrom, and being positioned upstream of said overfall wall;
a waterwheel positioned in said wastewater channel at a location downstream of said overfall wall, and being operably connected with said clearing member for mechanically shifting the same to remove the screenings from said screening member without using external power; and
a waterwheel linkage mechanism having a linkage portion thereof passing through said overfall wall in a watertight fashion and operably connecting said waterwheel with said clearing member.

11. A screening device as set forth in claim 10, wherein:
said clearing member includes at least one wiping element.

12. A screening device as set forth in claim 10, wherein
said screening member includes a plurality of screening rods; and
said clearing member includes a plurality of wiping elements which are disposed between said screening rods.

13. A screening device for wastewater, and the like, comprising:
a perforate screening member through which wastewater in an associated wastewater channel flows from a bottom side thereof to a top side thereof, such that solids in the wastewater are captured by said screening member and form screenings on said screening member;
an overfall wall positioned in said wastewater channel;
a clearing member being shiftable relative to said screening member for clearing the screenings therefrom, and being positioned upstream of said overfall wall;
a waterwheel positioned in said wastewater channel at a location downstream of said overfall wall, and being operably connected with said clearing member for mechanically shifting the same to remove the screenings from said screening member without using external power; and
a waterwheel linkage mechanism having a linage which passes through a notch in said overfall wall and includes a front box to render watertight said notch.

* * * * *